(12) United States Patent
Gerrard et al.

(10) Patent No.: US 8,172,245 B2
(45) Date of Patent: May 8, 2012

(54) LEAF SPRING SUSPENSION SYSTEM

(76) Inventors: Robert Gerrard, Coventry (GB); Marcus Gerrard, Coventry (GB)

(*) Notice: Subject to any disclaimer, the term of this patent is extended or adjusted under 35 U.S.C. 154(b) by 197 days.

(21) Appl. No.: 12/672,511

(22) PCT Filed: Sep. 1, 2008

(86) PCT No.: PCT/GB2008/002960
§ 371 (c)(1),
(2), (4) Date: Feb. 6, 2010

(87) PCT Pub. No.: WO2009/027710
PCT Pub. Date: Mar. 5, 2009

(65) Prior Publication Data
US 2011/0291380 A1    Dec. 1, 2011

(30) Foreign Application Priority Data

Sep. 1, 2007  (GB) .................................. 0717041.8
Dec. 11, 2007 (GB) .................................. 0724106.0

(51) Int. Cl.
*B60G 11/00*  (2006.01)
(52) U.S. Cl. ................................................. 280/124.175
(58) Field of Classification Search ............ 280/124.17, 280/124.175, 124.177, 124.174, 124.176, 280/124.163
See application file for complete search history.

(56) References Cited

U.S. PATENT DOCUMENTS

| 4,678,204 | A | * | 7/1987 | Hetherington | ............ 280/124.17 |
| 4,711,465 | A | * | 12/1987 | Raidel | .................... 280/124.106 |
| 4,718,693 | A | * | 1/1988 | Booher | ................... 280/124.107 |
| 4,872,653 | A | * | 10/1989 | Chuchua | ........................ 267/271 |
| 6,015,158 | A | * | 1/2000 | Overby | ..................... 280/11.225 |
| 6,019,384 | A | * | 2/2000 | Finck | ......................... 280/124.17 |
| 6,328,324 | B1 | * | 12/2001 | Fenton | ..................... 280/124.163 |
| 6,406,007 | B1 | * | 6/2002 | Wilson | .......................... 267/36.1 |
| 6,428,025 | B1 | * | 8/2002 | Suh | .......................... 280/124.106 |
| 6,454,283 | B1 | * | 9/2002 | Fenton | ................... 280/124.163 |

(Continued)

FOREIGN PATENT DOCUMENTS

EP    0413318 A    2/1991

(Continued)

OTHER PUBLICATIONS

GB Search Report under Section 17(5) of Jan. 14, 2008 in GB application GB0717041.8.

(Continued)

*Primary Examiner* — Faye M. Fleming
(74) *Attorney, Agent, or Firm* — Young Law Firm, P.C.

(57) ABSTRACT

A leaf spring suspension system for supporting a vehicle chassis (104) relative to a vehicle axle (105), the suspension system being arranged to be connected between first and second spaced connection locations of said vehicle chassis. The suspension system comprises a first elongate leaf member (10) arranged to be pivotably connected at a first end (14) thereof to the first connection location, and a second leaf member (12) pivotably connected at a second end (16) of said first member (10). A link member (108) is connected between the second leaf member (12) and the second connection location of said chassis, wherein the link member (108) is pivotably connected to the second leaf member at a first end thereof and is connected to the chassis at a second end thereof such that the angular orientation of the link member relative to the chassis can be altered in order to accommodate raising or lowering of the chassis relative to the vehicle axle.

21 Claims, 5 Drawing Sheets

U.S. PATENT DOCUMENTS

| | | | |
|---|---|---|---|
| 6,485,040 B1 * | 11/2002 | Dudding | 280/124.175 |
| 6,527,287 B2 * | 3/2003 | Hedenberg | 280/124.163 |
| 7,036,805 B2 * | 5/2006 | Renaudot | 267/189 |
| 7,229,088 B2 * | 6/2007 | Dudding et al. | 280/124.17 |

FOREIGN PATENT DOCUMENTS

| | | | |
|---|---|---|---|
| GB | 245699 A | 1/1926 | |
| JP | 2006044345 A | 8/2004 | |
| WO | 97/29920 A | 8/1997 | |

OTHER PUBLICATIONS

International Search Report of Oct. 24, 2008 in related PCT application PCT/GB2008/002960 (2 pages).

* cited by examiner

LEAF SPRING SUSPENSION SYSTEM

BACKGROUND OF THE INVENTION

1. Field of the Invention

The present invention relates to vehicle suspension and more specifically to a leaf spring type suspension for use on road vehicles.

2. Description of the Prior Art and Related Information

Whilst coil spring suspension systems are adopted for a number of modern passenger vehicles, leaf spring suspension systems are often preferred for vehicles which are capable of supporting greater loads, such as, for example vans, trucks, buses, trailers and other passenger or commercial vehicles.

A conventional leaf spring arrangement is typically attached at its opposing ends to a chassis member via intermediate links referred to as hangers. The vehicle axle is attached to a central portion of the leaf spring arrangement such that relative movement between the axle and the chassis member is resisted by the restoring force of the leaf spring.

A conventional multi-leaf or parabolic leaf spring suspension systems provides for a fixed vehicle ride height under steady state loading conditions. However there are a number of practical reasons why it may be necessary to raise or lower the vehicle height relative to the axle. Such instances include, for example, the carrying heavy loads, for towing trailers or the like, or the lowering of suspension for improved vehicle handling. These adjustments would generally require a conventional leaf spring suspension system to be removed and modified or replaced with an alternative leaf spring arrangement in order to allow a different height to be achieved.

It will be appreciated by those skilled in the art that the adjustment or replacement of such conventional leaf spring suspension systems requires a considerable amount of work and is not readily undertaken without a specific commercial need. The replacement of a leaf spring suspension system can result in a vehicle being off the road for a number of days, which is particularly undesirable for commercial vehicles.

This problem has been acknowledged and a number of solutions have been proposed in the past. One such solution involves the use of a tensioning arrangement, typically in the form of a hydraulic piston and cylinder, which can raise and lower the height of the chassis relative to the axle against the force of the spring. However this solution significantly increases the cost and complexity of the suspension system and compromises the effectiveness of the leaf spring arrangement by forcing it to operate in a condition which is offset from the natural equilibrium of the spring.

The adjustment of a leaf spring suspension to allow the chassis to be raised or lowered relative to the axle poses a particular design problem since a conventional leaf spring suspension system also serves a secondary function in that it maintains the lateral stability of the chassis relative to the axle.

It is an object of the present invention to provide an improved vehicle suspension system which allows adjustment of the height of chassis relative to the axle without substantially jeopardizing the lateral stability of the vehicle. It is a further object of the present invention to provide a suspension system which is simple to install and adjust.

SUMMARY OF THE INVENTION

According to a first aspect of the present invention there is provided a leaf spring suspension system for supporting a vehicle chassis relative to a vehicle axle, wherein the suspension system is arranged to be connected between first and second spaced connection locations of said vehicle chassis and comprises: a first elongate leaf member arranged to be pivotably connected at a first end thereof to the first connection location; a second leaf member pivotably connected at a second end of said first member; and a link member arranged to be connected between the second leaf member and the second connection location of said chassis, wherein the link member is pivotably connected to the second leaf member at a first end thereof and is connected to the chassis at a second end thereof such that the angular orientation of the link member relative to the chassis can be altered in order to accommodate raising or lowering of the chassis relative to the vehicle axle.

The link member may be pivotably connected to the chassis at its second end.

The first leaf member, second leaf member and link member may be pivotable about substantially parallel axes of rotation. The first leaf member, the second leaf member and the link member are typically connected in line. This serves to constrain the freedom of movement of the leaf spring suspension system so as to provide lateral stability. This avoids the need for stabilizing arms, often referred to as pan arms, which are associated with adjustable suspension systems according to the prior art.

Furthermore, a suspension system according to the present invention can be installed on a vehicle at the same points as a conventional leaf spring suspension system. Thus the present invention can be retrofitted to a vehicle simply and at low cost.

The first and second leaf spring members may be formed of spring steel.

Either or both of the first and second leaf spring members may be shaped to receive a pin or bolt at an end thereof. Typically either or both of the first and second leaf spring members is rolled at least one end thereof so as to form a eye, within which a pin or locking member can be received. In one embodiment, the rolled eye on one of the first or second leaf member is provided with a cut out or recess for receiving the eye of the other of the first or second member. The respective ends of the first and second leaf members may fit together about a common pin. This significantly improves the lateral stability of the leaf spring. In addition this minimizes the number of parts involved in the suspension system and allows a length of spring steel to be machined to provide suitable connection formations at one or both ends thereof with minimal cost.

The respective ends of the first and second leaf members may fit together about a common axis so as to allow a locking member to be inserted therebetween for locking the relative angular orientation of the first and second leaf members.

The link member may comprise a shackle. The link member and the first leaf member may be attached to the chassis via a respective hanger.

In one embodiment, one or more pins within the system take the form of bolts which can be selectively tightened to lock the relative angular orientations of the first and second leaf members and the link member. Thus the system can be raised or lowered to the desired height and locked to maintain the desired ride height of the vehicle.

In one embodiment, one or more locking members within the system take the form of splined members shaped to engage with castellations within the ends of the first and second leaf members. The splined member may be a splined pin. A rolled eye in the end of each of the first and second leaf members may be provided with inwardly facing castellations. The locking member may be trapped between the eyes of the first and second leaf members by way of a nut or the like. Thus the splined member inhibits rotation of the first and second leaf members once inserted such that the system can be raised or lowered to the desired height and locked to maintain the desired ride height of the vehicle. In an additional or alternative embodiment, the suspension system may be used to raised or lower a vehicle chassis to provide access thereto. In such an embodiment, the suspension system may comprise adjustment means connected in the force path between the axle and the chassis. The adjustment means may be pneumatically or hydraulically powered and in one embodiment, the adjustment means comprises an airbag. In such an embodiment, the pins between the suspension system members may not need to be tightened during use since the weight of the vehicle chassis and any additional load may be supported by the adjustment means during use.

According to a further aspect of the present invention there is provided a method of manufacture of a suspension system according to the first aspect of the present invention.

BRIEF DESCRIPTION OF THE DRAWINGS

Preferred embodiments of the present invention are described in further detail below with reference to the accompanying drawings, of which:

FIG. 1b shows a plan view of the first leaf member of FIG. 1a;

FIG. 1c shows a side view of the second leaf member of FIG. 1a;

FIG. 1d shows details of the gears for connecting the first and second leaf members of FIG. 1a;

DETAILED DESCRIPTION

Turning firstly to FIG. 1, there is shown a first leaf member which takes the form of a parabolic leaf spring 10 and a second leaf member which comprises an arm 12. The leaf spring 10 and arm 12 are formed of spring steel. In contrast to the parabolic leaf spring 10, the arm 12 is form of a length of material which has substantially uniform thickness.

Figure 1A:
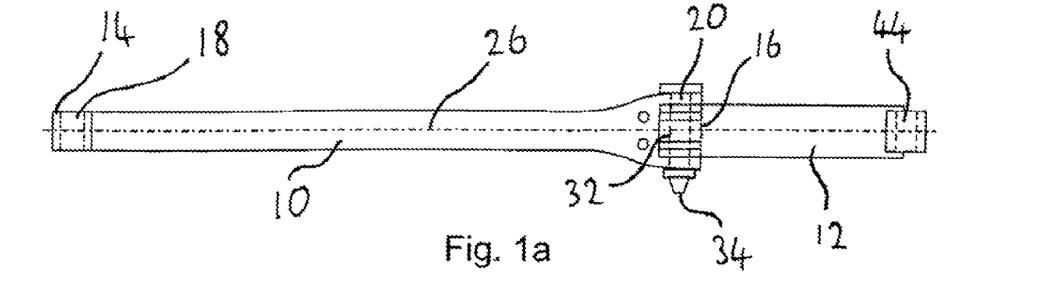
FIG. 1a shows a plan view of first and second leaf members according to a first embodiment of the present invention.
Figure 3A:
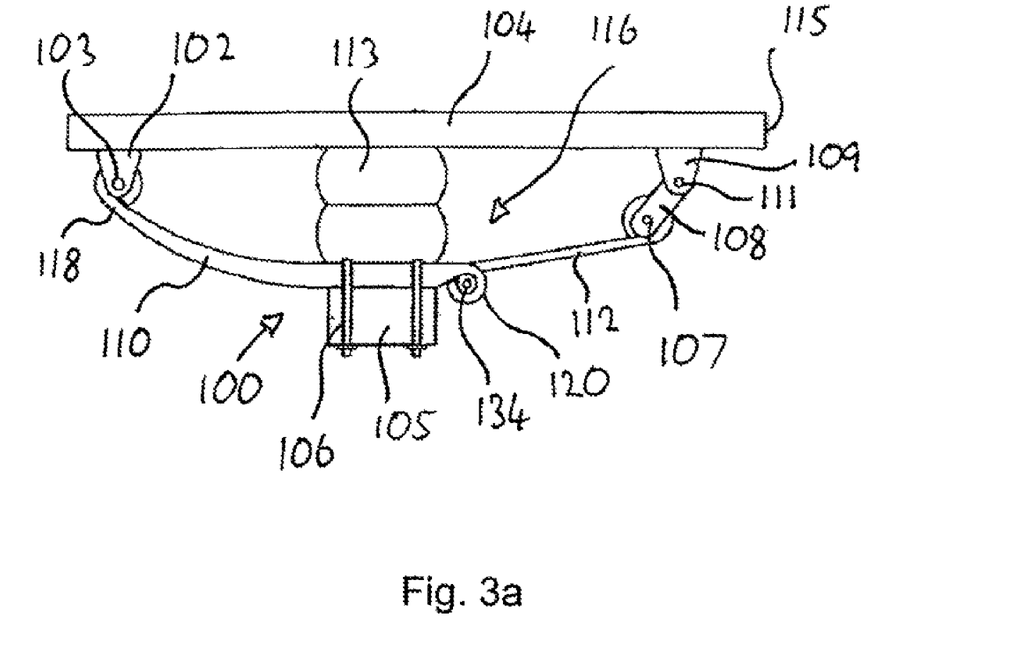
FIG. 3a shows a side view of a suspension system according to a third embodiment of the present invention.

The leaf spring has opposing ends 14 and 16 which have each been rolled to form eyes 18 and 20. The eye 18 is shaped to receive a pin (not shown) such that the end 14 can be fitted to a chassis via a conventional hanger arrangement (see FIG. 3). The end 16 can be seen more clearly in FIG. 1b and comprises a section 22 having increased width compared to the remainder of the leaf 10. The increased width section 22 has been rolled back upon itself to form eye 20. A slot or cut out 24 has been provided in the wall of the eye 20 substantially aligned with the central axis 26 of the leaf 10. The cut out 24 splits the eye 20 into two opposing eye portions 28 and 30 on either sides of the cut out.

Figure 1B:
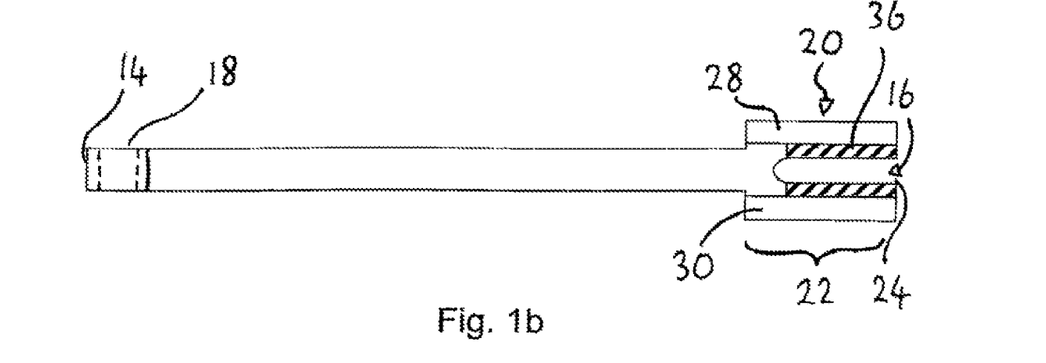

The arm 12 has a correspondingly shaped eye 32 formed in the end thereof. The eye 32 is of reduced width such that it can be located within the cut out 24. The eyes 20 and 32 are of substantially the same diameter such that they can be aligned in a coaxial manner so as to allow a pin or bolt 34 to be passed through both eyes so as to form a hinge between the leaf 10 and arm 12.

Figure 1C:
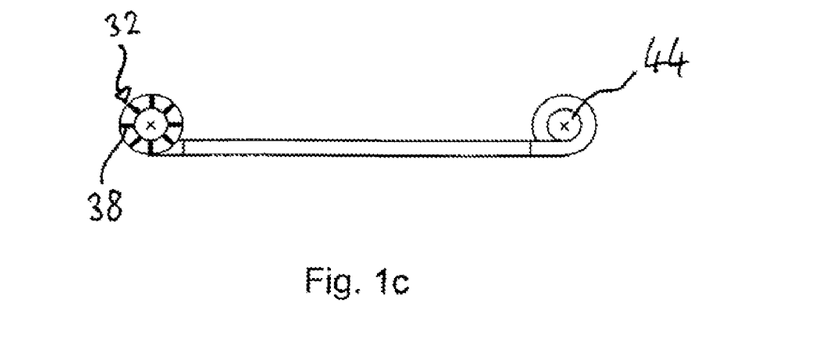

As can be seen in FIGS. 1b and 1c, each of the eyes 20 and 32 are provided with respective washers 36 and 38. The washers 36 are provided on inwardly facing circumferential edges of the cut out 24 of the eye 20. The washers 38 are provided on the outwardly facing circumferential edges of the eye 32. Thus the washers 36 and 38 are opposing when the hinge between the leaf 10 and arm 12 is formed as shown in FIG. 1a.

Figure 1D:
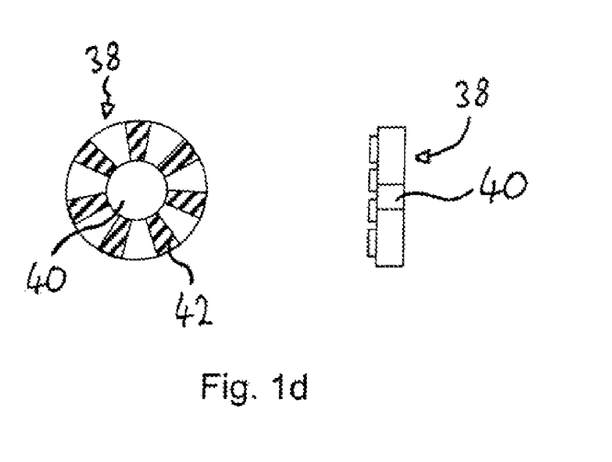

FIG. 1d shows a plan view and sectional view of the washers 38 which are ring shaped, having a central bore 40 therein and a series of radially extending teeth formations 42. The washers 36 are similar in form such that the teeth of each washer engage the teeth of the opposing washer in use.

The bolt 34 has a head at one side of the hinge and locking means in the form of a nut on the opposing side of the hinge when formed. Thus the bolt can be tightened so as to force the opposing washers into engagement so as to lock the hinge during use. The bolt 34 can be released to allow adjustment of the relative angular orientations of the leaf 10 and arm 12 and retightened to lock the hinge when the suspension is in use. The leaf 10 can advantageously be formed of a single length of spring steel material. The material can be machined to reduce the width of the leaf for all but the increased width portion 22. The eye 20 is then formed by rolling and/or pressing the end 16 to form a cylindrical profile. The slot 24 is then cut out of the eye 20.

The arm 12 is also formed of a single length of spring steel material. The eye 32 may be rolled and then machined to reduce its width or vice versa. The washes may then be welded to the respective eyes ready for assembly of the hinge by locating the eye 32 within the eye 20 and inserting the bolt 34 through the common bore formed thereby.

This represents a simple and robust method of forming a strong leaf spring hinge which is resilient to lateral forces. It will be appreciated that the slot 24 in this embodiment is substantially U shaped. However other shapes may be provided such as for example a V shaped, rectangular or curved slot. The eye 32 will be correspondingly shaped to fit within the slot. In addition, the cut out may be provided in the arm 12 instead of the leaf 10. In such an embodiment the eye at the end 16 of leaf 10 will be shaped in accordance with the eye 32 shown in FIG. 1a so as to fit within the cut out.

The arm 12 also has a further eye 44 formed in the opposing end thereof for attachment to a link member as will be described in further detail below.

Figure 2:
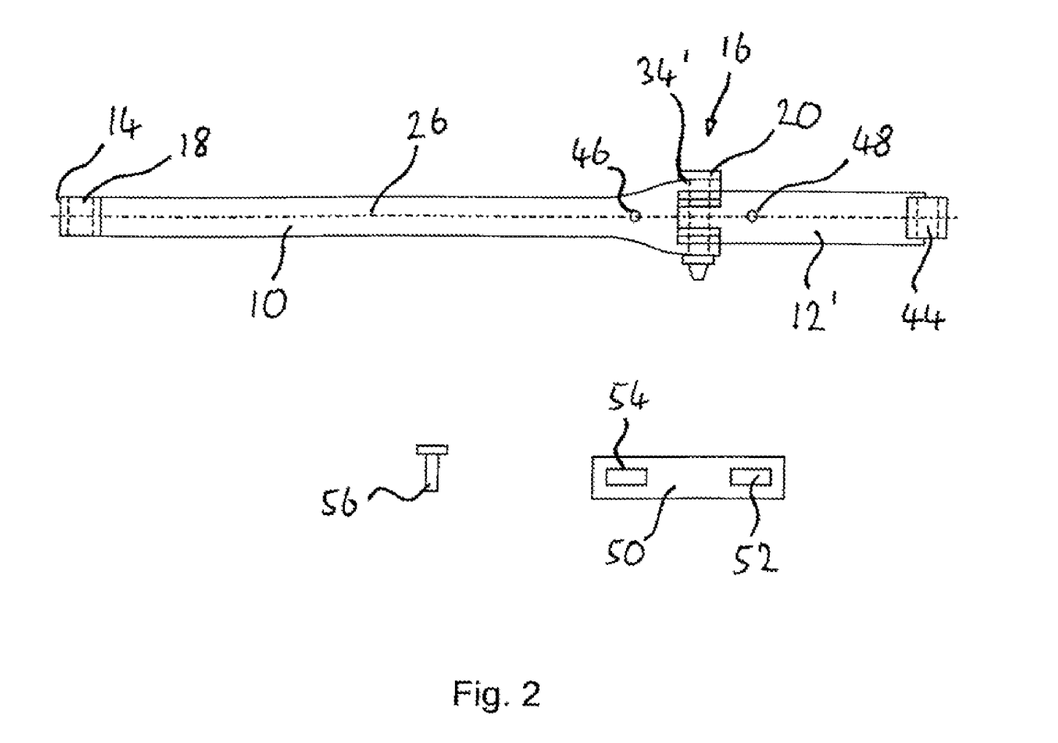
FIG. 2 shows a plan view of first and second leaf members according to a second embodiment of the present invention.

Turning now to FIG. 2, there is shown a further embodiment of the present invention. The second embodiment is similar to that of the embodiment of FIG. 1 and like parts have been given like numerals. However the leaf member 10' has been provided with an aperture 46 spaced towards the end 16 and spaced a short distance from the rolled eye 20. The arm 12' has also been provided with an aperture 48 a short distance from the eye 42. The apertures 46 and 48 provide holes for attachment of a fixing member 50 about the hinge. The fixing member 50 is an elongate piece of spring steel in the form of a locking plate with elongate apertures 52, 54 therein. The holes 52, 54 are provided towards each end of the fixing member 50 for alignment with the holes 46 and 48 during use. Once the desired orientation of the leaf 10' and arm 12' has been achieved, the fixing member 50 can be fixed across the hinge using bolts 56 which pass through the relevant holes. This locks the leaf 10' and arm 12', thus preventing rotation about the hinge. The locking plate 50 may have angled or beveled edges for contact with the leaf and/or arm 12'. The elongate apertures 52, 54 are range-taking in that they allow a range on angles between the leaf 10' and arm 12' to be accommodated.

The fixing member 50 may avoid the need for the gear washers shown in FIG. 1. Thus a simple pin or bolt can be used to connect the leaf 10' and arm 12'. Alternatively, the fixing member 50 may be used in conjunction with the bolt and washer arrangement of FIG. 1 for increased resilience.

Turning now to FIG. 3 there is shown a side view of a suspension system 100 according to the present invention. The leaf member 110, the arm 112 and the features thereof may take the form of those parts shown in either of FIG. 1 or 2 and will not be described in further detail. However it is envisaged that the hinge portion between the leaf 110 and arm 112 need not be locking in the manner of either FIG. 1 or 2, but can instead be pivotable about a simple pin 134.

The rolled eye 118 of the leaf 110 is attached to a hanger 102 via a pin 103. The hanger is rigidly attached to the vehicle chassis 104 such that the leaf 110 can pivot relative to the chassis 104 about pin 103. An axle housing 105 is attached towards the end 116 of the leaf 110 adjacent the rolled eye 120. The axle housing 105 may be attached to the leaf member 110 using bolts, metal straps or any other conventional type of leaf spring fastening 106 as would be apparent to the person skilled in the art. The rolled eye 144 at the end of the arm 112 which is spaced from the leaf 110 is connected to a link member 108 by a pin 107. The link member takes the form of a swinging shackle which is in turn attached to a further hanger 109 by a pin joint 111. The hanger 109 is fixedly mounted on the chassis member 104 at a distance from the hanger 102.

An air bag 113 is positioned between the axle housing 105 and the chassis 104 such that the weight of the vehicle chassis is supported on the axle at least in part by the air bag 113 when inflated. In this embodiment the airbag 113 is trapped between the leaf spring 110 and the chassis 104, between the spaced hangers 102 and 109.

During normal operation of the vehicle, the weight of the vehicle chassis and any load is supported on the axle by the inflated airbag 113. The degree of inflation of the air bag 113 thus defines the ride height of the vehicle. In this embodiment, the vehicle weight may also be partially supported by the leaf spring suspension system.

For loading and/or unloading of the vehicle, typically when the vehicle is stationary, it may be beneficial to lower the height of the vehicle chassis relative to the axle. This can be achieved using the suspension system of FIG. 3 by deflating the air bag 113, allowing the rear end 115 of chassis member 104 to be lowered towards the ground as shown in FIG. 3*b*.

Figure 3B:
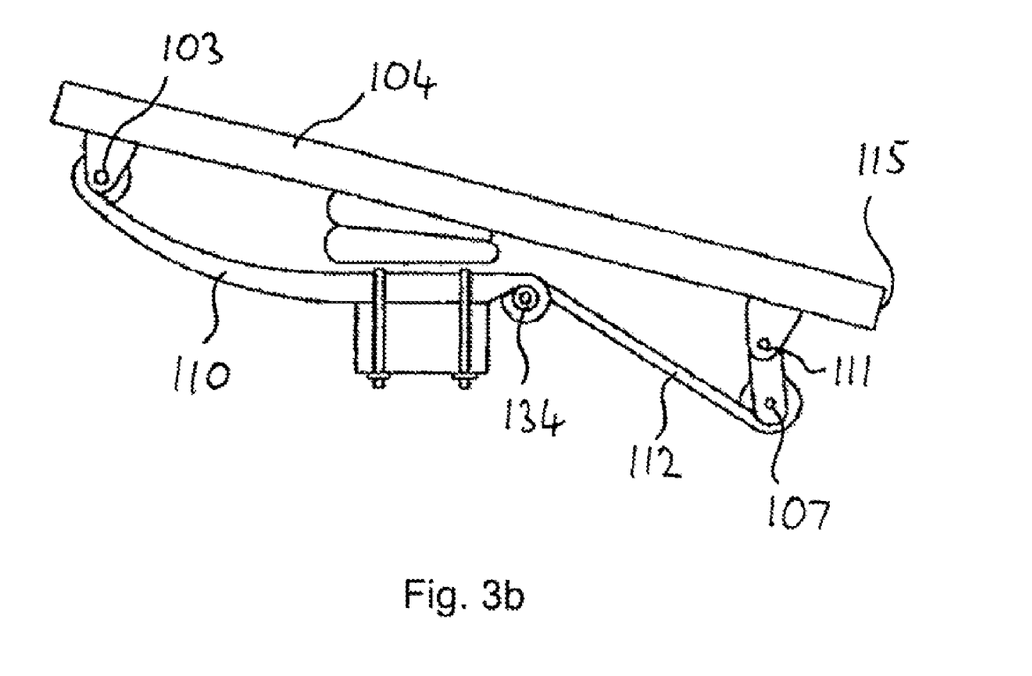
FIG. 3b shows a side view of the suspension system of FIG. 3a in a lowered condition.

In order to achieve the orientation shown in FIG. 3*b*, the chassis has pivoted about pin 103 relative to the leaf spring member 110. The spring arm 112 has pivoted about pin 134 relative to the leaf 110 such that it is now under a tensioned condition. The swinging shackle has pivoted about pins 107 and 111 such that the angular orientation of the shackle relative to the chassis hanger has altered. This double pivoting of the shackle allows the distance between the pin 103 of hanger 102 and the pin 107 of the shackle 108 to be varied so that the system can accommodate the change in angle of the chassis. Thus it will be appreciated that pin 107 is further from pin 103 in FIG. 3*b* than in FIG. 3*a* such that the shackle adopts a substantially vertical orientation.

When any loading or unloading operation of the vehicle has bee completed, the air bag 113 can be inflated to raise the vehicle chassis 104 back to the desired ride height.

Figure 4:
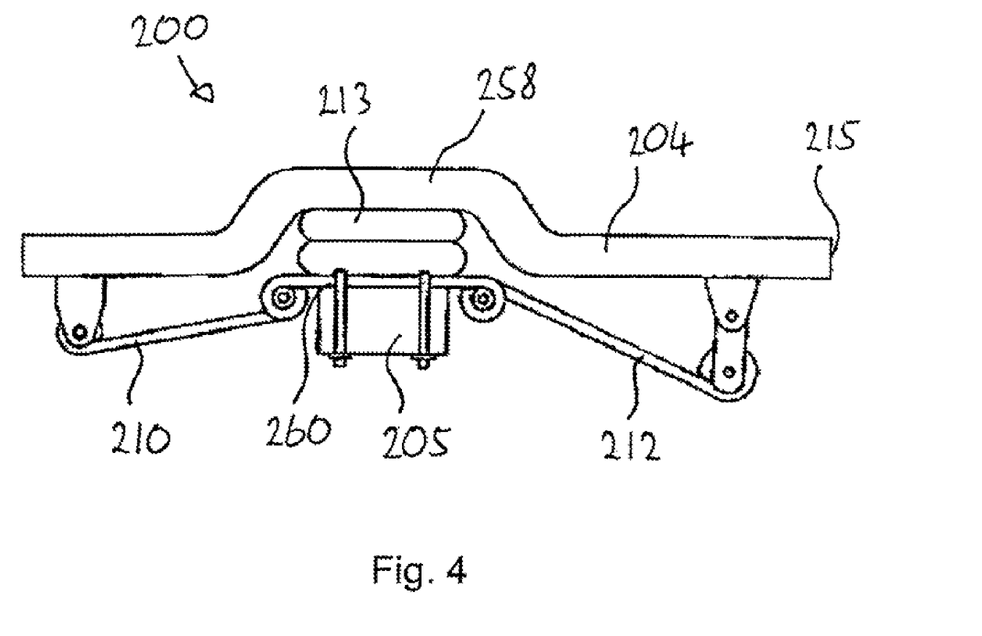
FIG. 4 shows a side view of a suspension system according to a fourth embodiment of the present invention in a lowered condition.

Turning now to FIG. 4, there is shown a further embodiment of a suspension system according to the present invention shown generally at 200. In this embodiment, the vehicle chassis 204 has a raised engagement section 258 for engagement with the air bag 213.

An intermediate spring arm 260 is provided between the leaf member 210 and the arm 212. The intermediate spring arm 260 has a rolled eye formation at each end thereof for attachment to the corresponding rolled eye formation on the leaf member 210 and arm 212. Thus the intermediate spring arm provided an additional link in the suspension system.

The axle housing 205 in this embodiment is attached to the intermediate spring arm such that the suspension system is substantially symmetrical about the centre of arm 260. The intermediate spring arm 260 is mounted substantially beneath the raised chassis section 258. This embodiment allows the vehicle chassis member 204 to be raised and lowered such that is substantially parallel with a supporting surface on which the vehicle stands. This avoids the need to tit the chassis when lowering. Thus the entire chassis can be lowered rather than only the rear end 215.

Figure 5:
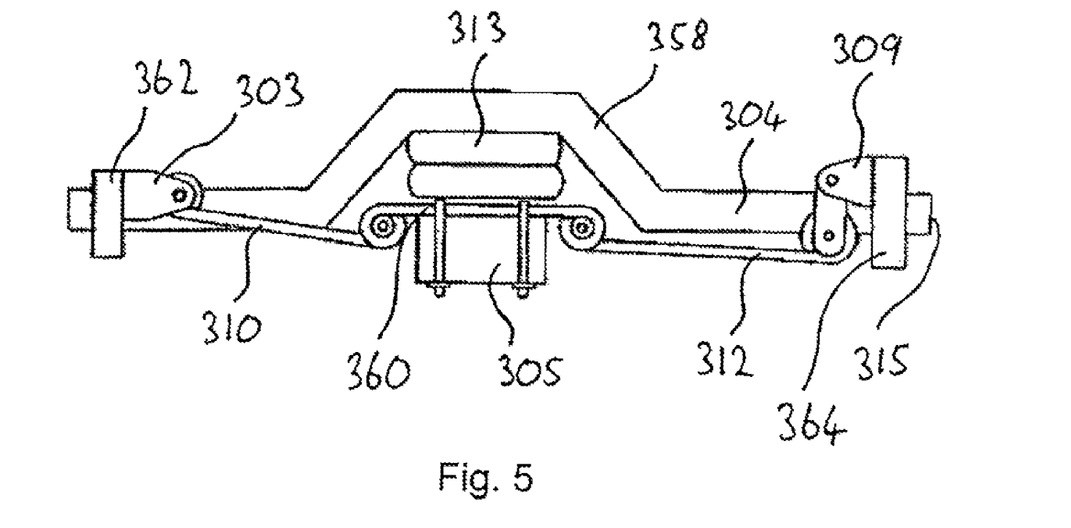
FIG. 5 shows a side view of a suspension system according to a fifth embodiment of the present invention in a partially lowered condition; and, FIG. 6 shows a plan view of first and second leaf members according to a further embodiment of the present invention.

Turning now to FIG. 5, a further embodiment is shown which is similar to that of FIG. 4. Like features have been numbered accordingly and operate in the manner described above. However in this embodiment the hangers 303 and 309 have been raised such that they are located above the lower edge of the chassis 304. This may be achieved by mounting the hangers 303 and 309 on corresponding spacer members 362 and 364 as shown in FIG. 5. The hangers may also be oriented substantially at right angles to the hangers of FIG. 4 such they depend inwardly towards the air bag from the spacers 362, 364.

The raising and lowering of the chassis in this embodiment is carried out in a similar manner to that of FIG. 5, save that the raised position of the hangers and increased depth of the raised chassis section 358 allows the chassis 304 to be lowered to substantially the level of the vehicle axis or lower.

By varying the relative dimensions, it would be possible to lower the chassis to ground level in order to greatly simplify loading and unloading from the vehicle. The raised position of the hangers is important in this embodiment since they would otherwise prevent the chassis member contacting the ground. The view of FIG. 5 is not in its fully lowered condition. When fully lowered, the raised bridge section 358 would sit adjacent the axle housing and the first and second spring arms would be orientated in a downward condition.

Figure 6:
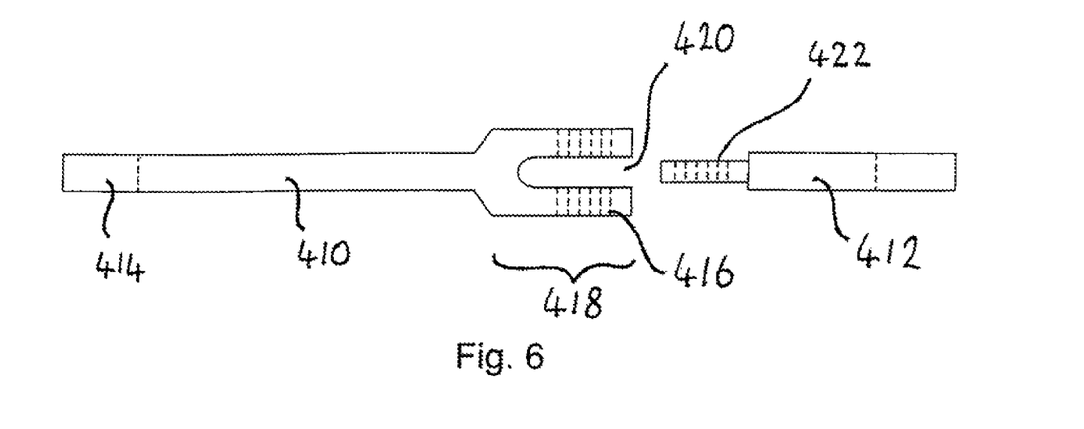

Turning now to FIG. 6, there is shown a further arrangement according to the present invention comprising a first leaf member which takes the form of leaf spring 410 and a second leaf member which comprises an arm 412. The leaf spring 410 and arm 412 are formed of spring steel.

The first leaf member 410 and second leaf member 412 may be used in any of the embodiments of FIGS. 1-5 in place of the first and second leaf members described above.

The opposing ends of the first leaf member 410 have each been rolled to form eyes 414 and 416. The eye 416 is shaped to receive a locking member in the form of a splined pin or bolt 417 (see FIG. 8). The eye formation 416 within the end of the first leaf member 410 comprises a section 418 having increased width compared to the remainder of the leaf member 410. The increased width section 418 has been rolled back upon itself to form the eye 416. A central slot or cut out 420 has been provided in the rolled section of the eye 416 substantially aligned with the central axis 426 of the leaf 410. The cut out 420 splits the eye 416 into two opposing eye portions on either sides of the cut out 420. Thus the eye 416 in fact comprises two adjacent but coaxial eye sections.

The arm 412 has a correspondingly shaped eye 422 formed in the end thereof. The eye 422 is of reduced width such that it can be located within the cut out 420. The eyes 416 and 422 are of substantially the same diameter such that they can be aligned in a coaxial manner so as to allow locking pin or bolt 417 to be passed through both eyes when eye 422 is aligned with eye 416 within the slot 420.

Figure 7:
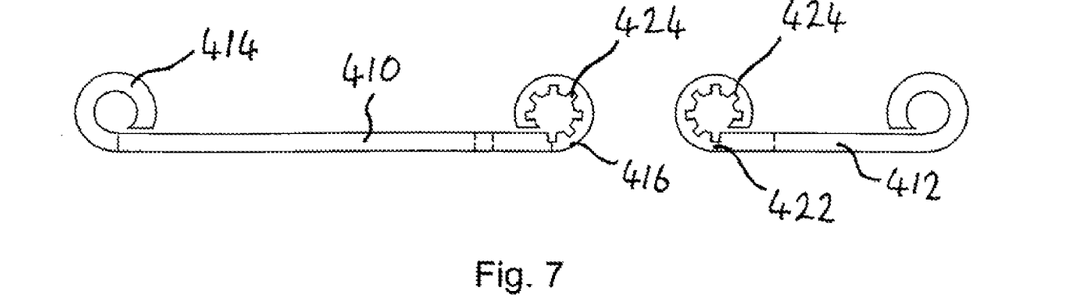
FIG. 7 shows a side view of the first and second leaf members of FIG. 6.

As can be seen in FIG. 7, each of the eyes 416 and 422 are provided with locking formations in the form of inwardly protruding castellations 424. The castellations take the form of teeth which are substantially evenly distributed about the inwardly facing edge of each eye 416 and 422. The castellations are arranged about the inner circumference of each eye such that they extend radially inwardly a short distance into the inner space of the eye.

Figure 8:
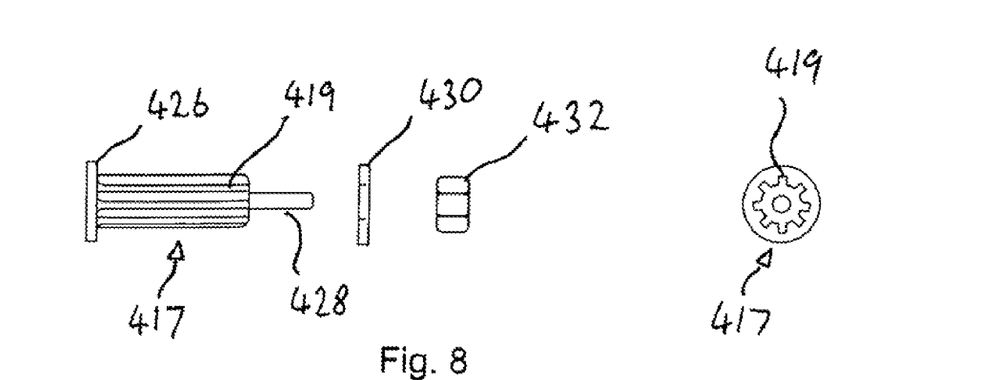
FIG. 8 shows plan and end views of a locking member for use with the embodiment of FIGS. 6 and 7.

During use the eyes 416 and 422 are arranged to be aligned in a coaxial manner such that the splined locking pin or bolt 417 can pass therethrough. The pin or bolt 417 has spline formations 419 which extend at least part way along the bolt 418 from a head end 426 to a free end 428 thereof. The head end 426 typically has a head formation of increased diameter so as to prevent the bolt passing completely through the eyes 416 and 422. Thus when the bolt is fully inserted into either eye 416 or 422, the head end 426 will abut against the side of the adjacent eye and act as a stop. When the bolt is inserted in this manner, the bolt splines 419 engage within the castellations 424 on each of the coaxially aligned eyes 416 and 422 so as to lock the leaf members 410 and 412 in a fixed angular orientation. A washer 430 and nut 432 can be applied to the free end of the bolt 418 so as to lock the bolt in position within the eyes 416 and 422.

This embodiment allows a simple solution for setting the desired ride height of the suspension system according to the present invention by positioning the members 410 and 412 in the desired orientation and then inserting and locking the locking member in eyes 416 and 422. Once the bolt 418 is inserted, the ride height of the vehicle becomes fixed by virtue of the interlocking teeth and spline formations.

In order to adjust the ride height, a user can simply remove the locking bolt 417 from the eyes 416 and 422, raise or lower the vehicle to the desired ride height using a conventional jack device (not shown) and then refit the lock bolt. The angular orientation of the leaf members 410 and 412 can be adjusted to suit a new vehicle ride height and the reinsertion of the bolt 417 fixes the suspension at that height.

This embodiment is particularly advantageous as it will allow vehicle ride height or a vehicle's loading height to be quickly adjusted without the need for a complicated manual procedure or tools and without requiring trained mechanics. The combined connection between the splined bolt 417 and the aligned eyes 416 and 422 forms a rigid connector which provides suspension and damping properties similar to that of a conventional leaf spring during use.

The components of any of the embodiments of FIGS. 1 to 8 may be interchanged as far as is practicably possible. It will be appreciated that the embodiments of FIGS. 3 to 5 may or may not make use of the locking means for fixing the orientation of the relevant components dependent on the usage requirements of the vehicle. Thus the suspension during transit may predominantly be provided by the air bag alone, the leaf spring suspension alone (by locking the leaf spring suspension system and partially deflating the air bag), or a combination of the two.

Furthermore any of the leaf member, the arm or the intermediate arm may be made of spring steel and may be of substantially uniform material thickness or else may take the form of a parabolic type spring for which the thickness varies over its length.

In any of the embodiments described above, the eye formation of the leaf spring member may be formed by rolling the leaf spring back upon itself in either an upward or downward orientation. This can be varied dependent on the available space for fitting the suspension system.

What is claimed is:

1. A leaf spring suspension system for supporting a vehicle chassis relative to a vehicle axle, the suspension system being configured to be connected between first and second spaced connection locations on the vehicle chassis, the suspension system comprising:
 a first elongate spring steel leaf member arranged to be pivotably connected at a first end thereof to the first connection location;
 a second spring steel leaf member pivotably connected at a first end thereof to a second end of the first member; and,
 a link member connected between the second leaf member and the second connection location of the chassis, the link member being connected to the second leaf member at a first end thereof and being connected to the chassis at a second end thereof enabling an angular orientation of the link member relative to the chassis to be altered to accommodate raising or lowering of the chassis relative to the vehicle axle,
 the first leaf member being shaped to define, at its second end, an integral eye formation, the second leaf member being shaped to define, at its first end, a corresponding integral eye formation, the integral eye formation at the second end of the first leaf member engaging with the integral eye formation at the first end of the second leaf member.

2. A leaf spring suspension system according to claim 1, wherein the first leaf member is pivotable about an axis of rotation that is substantially parallel to an axis of rotation of either, or any combination of, the second leaf member and the link member.

3. A leaf spring suspension system according to claim 1, wherein the eye formations of the first and second leaf members are configured to receive an insertable member therein.

4. A method of adjusting a ride height of a vehicle comprising a suspension system according to claim 1, the method comprising the steps of:
 pivoting the first leaf member relative to the second leaf member so as to adjust the height of the vehicle chassis relative to the vehicle axle, and
 supporting the vehicle chassis at the adjusted height.

5. The method of adjusting the ride height of a vehicle of claim 4, wherein the step of supporting the vehicle chassis at the adjusted height includes locking the second leaf member relative to the second end of the first leaf member.

6. The method of adjusting the ride height of a vehicle of claim 4, wherein the step of supporting the vehicle chassis at the adjusted height includes inflating an airbag interposed in a force path between the vehicle chassis and the vehicle axle.

7. A leaf spring suspension system for supporting a vehicle chassis relative to a vehicle axle, the suspension system being configured to be connected between first and second spaced connection locations on the vehicle chassis, comprising:

9 a first elongate spring steel leaf member arranged to be pivotably connected at a first end thereof to the first connection location;

a second spring steel leaf member pivotably connected at a first end thereof to a second end of the first member and, a link member connected between the second leaf member and the second connection location of the chassis, the link member being connected to the second leaf member at a first end thereof and being connected to the chassis at a second end thereof enabling an angular orientation of the link member relative to the chassis to be altered to accommodate raising or lowering of the chassis relative to the vehicle axle, the first leaf member defining, at its second end, an integral eye formation that engages with a corresponding integral eye formation defined at the first end of the second leaf member, the eye formation of one of the first and the second leaf member being configured to be inserted into a cutout within the corresponding eye of the other of the first or the second leaf member.

8. A leaf spring suspension system according to claim 7, wherein respective eye formations formed in each of the first and the second leaf members are located coaxially and wherein the insertable member is a single insertable pin that pivotally connects the first and the second leaf members.

9. A leaf spring suspension system for supporting a vehicle chassis relative to a vehicle axle, the suspension system being configured to be connected between first and second spaced connection locations on the vehicle chassis, comprising:

a first elongate spring steel leaf member arranged to be pivotably connected at a first end thereof to the first connection location;

a second spring steel leaf member pivotably connected at a first end thereof to a second end of the first member and, a link member connected between the second leaf member and the second connection location of the chassis, the link member being connected to the second leaf member at a first end thereof and being connected to the chassis at a second end thereof enabling an angular orientation of the link member relative to the chassis to be altered to accommodate raising or lowering of the chassis relative to the vehicle axle, the first leaf member defining, at its second end, an integral eye formation that engages with a corresponding integral eye formation defined at the first end of the second leaf member, the eye formations of the first and second leaf members being configured to receive an insertable member therein, respective eye formations formed in each of the first and the second leaf members being located coaxially and the insertable member being a single insertable pin that pivotally connects the first and the second leaf members.

10. A leaf spring suspension system for supporting a vehicle chassis relative to a vehicle axle, the suspension system being configured to be connected between first and second spaced connection locations on the vehicle chassis, comprising:

a first elongate spring steel leaf member arranged to be pivotably connected at a first end thereof to the first connection location;

a second spring steel leaf member pivotably connected at a first end thereof to a second end of the first member;

a link member connected between the second leaf member and the second connection location of the chassis, the link member being connected to the second leaf member at a first end thereof and being connected to the chassis at a second end thereof enabling an angular orientation

10 of the link member relative to the chassis to be altered to accommodate raising or lowering of the chassis relative to the vehicle axle, the first leaf member defining, at its second end, an integral eye formation that engages with a corresponding integral eye formation defined at the first end of the second leaf member, the leaf suspension system further comprising a releasable lock configured to selectively fix relative orientations of the first and the second leaf members.

11. A leaf spring suspension system according to claim 10, wherein the lock comprises one of a pin and bolt that is configured to connect the second end of the first leaf member to the second member and that is configured to be selectively tightened to lock the leaf members.

12. A leaf spring suspension system according to claim 10, wherein the lock comprises opposing washers located on each of the first and the second leaf members.

13. A leaf spring suspension system according to claim 10, wherein the lock comprises a member that is configured to selectively attach between the first and the second leaf members at a point spaced from an end of each of the members so as to prevent relative rotation thereof.

14. A leaf spring suspension system according to claim 10, wherein the lock comprises a splined one of pin and bolt that is configured to engage with corresponding castellations formed within the eye formation of the first and the second leaf members.

15. A leaf spring suspension system for supporting a vehicle chassis relative to a vehicle axle, the suspension system being configured to be connected between first and second spaced connection locations on the vehicle chassis, comprising:

a first elongate spring steel leaf member arranged to be pivotably connected at a first end thereof to the first connection location;

a second spring steel leaf member pivotably connected at a first end thereof to a second end of the first member and, a link member connected between the second leaf member and the second connection location of the chassis, the link member being connected to the second leaf member at a first end thereof and being connected to the chassis at a second end thereof enabling an angular orientation of the link member relative to the chassis to be altered to accommodate raising or lowering of the chassis relative to the vehicle axle, the first leaf member defining, at its second end, an integral eye formation that engages with a corresponding integral eye formation defined at the first end of the second leaf member the leaf spring suspension system comprising a drive configured to selectively raise and lower the chassis relative to the vehicle axle.

16. A leaf spring suspension system according to claim 15, wherein the drive comprises an air bag in the force path between the chassis and the axle.

17. A leaf spring suspension system according to claim 15, wherein the drive, at least in part, supports the weight of the chassis during use.

18. A leaf spring suspension system for supporting a vehicle chassis relative to a vehicle axle, the suspension system being configured to be connected between first and second spaced connection locations on the vehicle chassis, comprising:

a first elongate spring steel leaf member arranged to be pivotably connected at a first end thereof to the first connection location;

a second spring steel leaf member pivotably connected at a first end thereof to a second end of the first member and, a link member including a shackle, the link member being connected between the second leaf member and the second connection location of the chassis, the link member being connected to the second leaf member at a first end thereof and being connected to the chassis at a second end thereof enabling an angular orientation of the link member relative to the chassis to be altered to accommodate raising or lowering of the chassis relative to the vehicle axle, the first leaf member defining, at its second end, an integral eye formation that engages with a corresponding integral eye formation defined at the first end of the second leaf member.

19. A method of manufacturing a leaf spring suspension system for supporting a vehicle chassis relative to a vehicle axle, the suspension system being configured to be connected between first and second spaced connection locations on the vehicle chassis, the leaf spring suspension system comprising a first elongate spring steel leaf member arranged to be pivotably connected at a first end thereof to the first connection location; a second spring steel leaf member pivotably connected at a first end thereof to a second end of the first member and, a link member connected between the second leaf member and the second connection location of the chassis, the link member being connected to the second leaf member at a first end thereof and being connected to the chassis at a second end thereof enabling an angular orientation of the link member relative to the chassis to be altered to accommodate raising or lowering of the chassis relative to the vehicle axle, the first leaf member defining, at its second end, an integral eye formation that engages with a corresponding integral eye formation defined at the first end of the second leaf member, the method comprising:

shaping the first spring steel leaf member so as to form the first eye therein;

shaping the second spring steel leaf member so as to form the second eye therein;

shaping at least one of the first and the second eye formations for mutual cooperation; and, inserting a common pin through the first and the second eye formations to connect the first and the second leaf members together via the first and the second eye formations.

20. The method of manufacturing a suspension system of claim 19, wherein at least one of the shaping steps comprises forming a cut out in one of the first and the second eye formations for reception of the other eye formation therein.

21. T The method of manufacturing a suspension system of claim 19, wherein at least one of the shaping steps comprises forming at least one castellation in one of the first and the second eye formations for reception of a splined locking member therein.

\* \* \* \* \*